United States Patent [19]

Ciantro et al.

[11] 3,999,689

[45] Dec. 28, 1976

[54] DEVICE FOR SIMULTANEOUSLY DELIVERING EQUAL AMOUNTS OF LIQUID

[76] Inventors: Steven V. Ciantro, 1211 E. 93rd St., Brooklyn, N.Y. 11235; Harold Coakley, 1775 Bruckner Blvd., Bronx, N.Y.

[22] Filed: Jan. 7, 1976

[21] Appl. No.: 647,318

[52] U.S. Cl. .............................. 222/108; 222/205; 222/394; 222/426; 222/482

[51] Int. Cl.[2] ........................................ G01F 11/28

[58] Field of Search .......... 222/108, 205, 330, 394, 222/426, 429, 482; 141/238, 242, 244

[56] References Cited

UNITED STATES PATENTS

| | | | |
|---|---|---|---|
| 1,925,592 | 9/1933 | Kleucker | 222/429 |
| 2,507,269 | 5/1950 | Quayle | 222/429 X |
| 2,791,353 | 5/1957 | Dorn et al. | 222/205 |
| 2,879,810 | 3/1959 | Craig | 141/238 |
| 3,880,011 | 4/1975 | Johnson | 222/205 |

*Primary Examiner*—Stanley H. Tollberg
*Assistant Examiner*—Frederick R. Handren
*Attorney, Agent, or Firm*—Steinberg & Blake

[57] ABSTRACT

A device for transmitting equal amounts of liquid simultaneously to a plurality of locations. An airtight enclosure has a bottom wall formed with a plurality of inwardly opening wells of equal volumes all having bottom openings through which liquid can flow out of the wells. A plurality of exteriorly located liquid-transmitting tubes communicate with the wells through the bottom openings, these tubes respectively having in their interiors valves which automatically close the tubes in response to suction in said interior space of the enclosure while opening said tubes in response to greater than atmospheric pressure in the interior of the enclosure. A liquid-supply header responds to less than atmospheric pressure in the space in the enclosure for delivering liquid thereto, this header communicating through tubular branches with the wells to transmit the liquid simultaneously to the wells while suction prevails in the interior space of the enclosure, this suction operating to automatically close the valves in the plurality of liquid-transmitting tubes so that in this way the wells are simultaneously filled with liquid. Then greater than atmospheric pressure is created in the space within the enclosure so as to push with this pressure the liquid simultaneously out of the several wells through the liquid-transmitting tubes while simultaneously opening the valves therein.

11 Claims, 3 Drawing Figures

FIG. 1
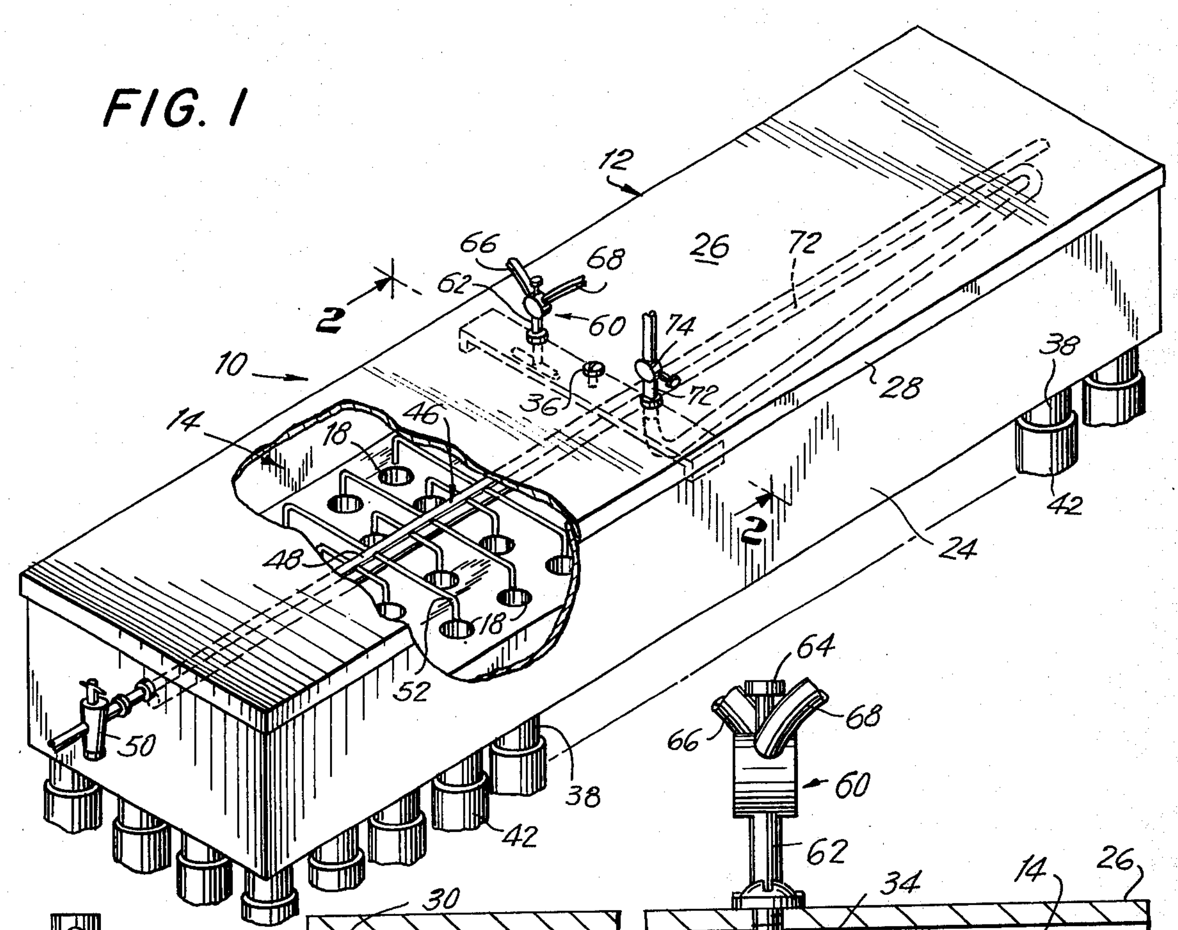
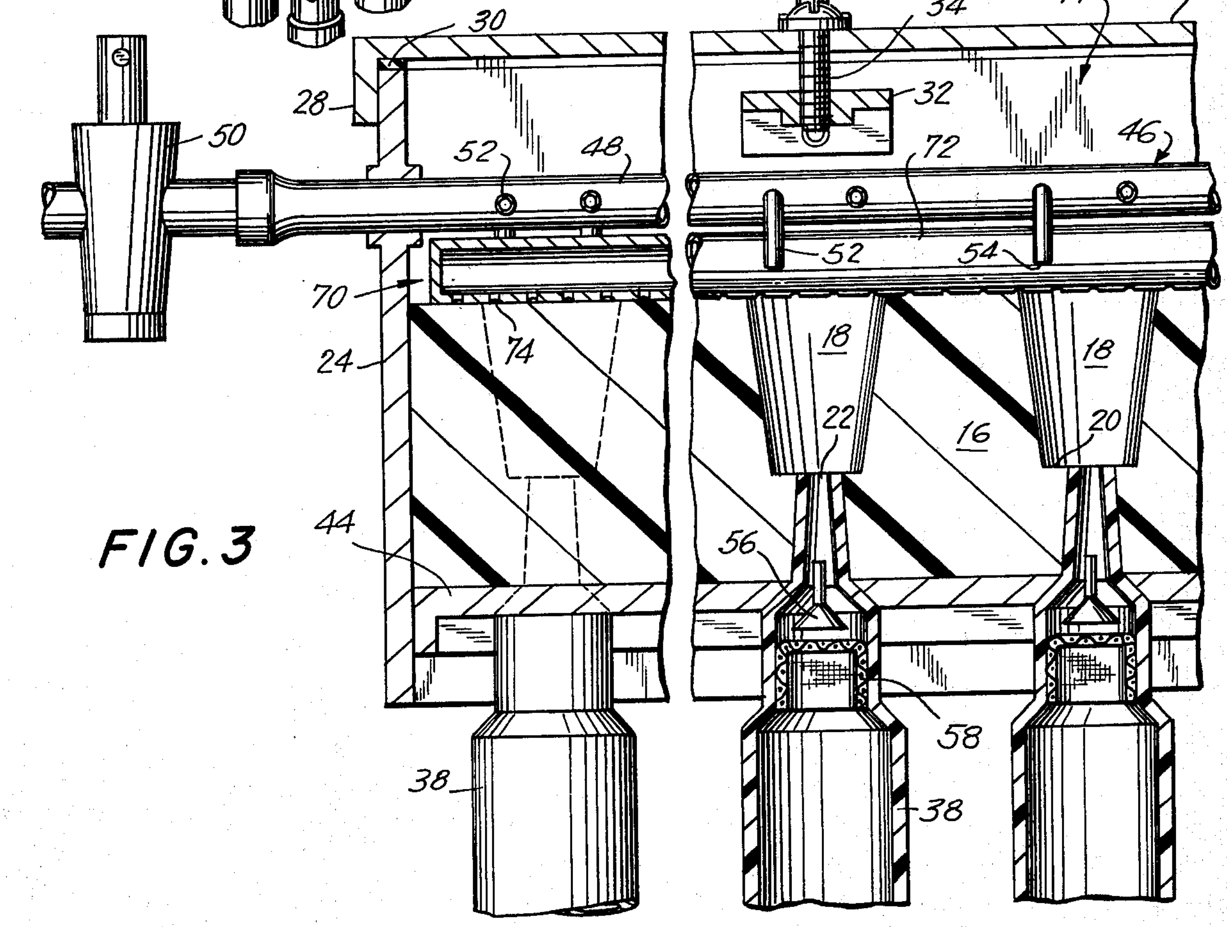
FIG. 3

DEVICE FOR SIMULTANEOUSLY DELIVERING EQUAL AMOUNTS OF LIQUID

BACKGROUND OF THE INVENTION

The present invention relates to devices for delivering precisely determined amounts of liquid to predetermined locations.

As is well known, there are many situations which require a precisely measured amount of liquid to be delivered to a predetermined location, and while the present invention deals with this latter problem, it also deals with the problem of delivering equal amounts of liquid respectively to a plurality of locations.

For example, in known techniques for checking for drug abuse, an eluting solution is delivered to a column in order to flow therethrough so that in connection with procedures of this type it is possible to determine from urine samples information with respect to given individuals.

At the present time, procedures of this latter type are carried out with manual pipetting devices which add the required amount of solution of each column individually. In addition, each column must be individually aspirated, so that this latter procedure also is time-consuming.

SUMMARY OF THE INVENTION

It is accordingly a primary object of the present invention to provide a device which does not require manual pipetting operations or the like in order to deliver a precisely determined amount of liquid to a predetermined location.

Furthermore, it is an object of the present invention to provide a device of this type which is capable of simultaneously delivering equal predetermined amounts of liquid to a plurality of locations.

Moreover, in the case of delivery of the liquid to columns as set forth above, it is an object of the invention to provide an apparatus capable of eliminating individual aspiration of each column.

Thus, it is an object of the present invention to provide a device which is capable of simultaneously delivering precisely determined amounts of liquid to a relatively large number of locations in a highly accurate manner.

Furthermore, it is an object of the present invention to provide a construction of this type according to which it is easily possible to initiate the operations in connection with delivery of equal amounts of liquid simultaneously to a predetermined number of locations, carry out these operations, and then terminate the operations and go forward to delivery of the precisely determined amount of liquid to the next series of predetermined locations, so that by way of the structure of the present invention it is possible very rapidly and conveniently to sequentially carry out a series of operations each of which involves delivering equal amounts of liquid to a relatively large number of locations, respectively.

It is, moreover, an object of the invention to provide a construction of the above type which is rugged, simple, and relatively inexpensive while at the same time being completely reliable in operation and capable of being used in most laboratories with facilities which are readily available in most laboratories.

The device of the invention for delivering equal amounts of liquid simultaneously to a plurality of locations includes an enclosure means which has an interior air-tight space, this enclosure means having beneath this interior space thereof a bottom wall which is formed with a plurality of wells all communicating with the interior space of the enclosure means and all adapted to be situated at the same elevation during use of the device. All of the wells respectively have equal volumes and they all have lowermost portions which are most distant from the space in the enclosure means and which are respectively formed with openings. A plurality of tubular liquid-transmitting means are situated at the exterior of the enclosure means and are all connected with the bottom wall of the enclosure means while all respectively communicating with the wells through the above openings at the lowermost portions thereof. A plurality of valve means are respectively situated in the plurality of tubular means for responding automatically to the presence of less than atmospheric pressure in the interior space of the enclosure means for assuming closed positions respectively closing the plurality of tubular means, while the plurality of valve means will respond to the presence of greater than atmospheric pressure in the interior of the enclosure means for automatically assuming open positions opening the plurality of tubular means, respectively. A liquid-supply means is connected with the enclosure means and extends fluid-tightly into the interior space thereof for supplying liquid to this interior space in response to the presence of less than atmospheric pressure in the interior space of the enclosure means, this liquid-supply means having a plurality of outlets respectively situated in alignment with the wells for delivering liquid thereto when the space in the interior of the enclosure means is at less than atmospheric pressure. A pressure-control means is connected with the enclosure means and communicates with the interior space thereof for controlling the pressure therein. This pressure-control means first provides less than atmospheric pressure in the interior of the enclosure means so as to act through the liquid-supply means to fill the wells with liquid while simultaneously placing the plurality of valve means in their closed positions. Then the pressure-control means provides greater than atmospheric pressure in the interior space of the enclosure means so as to act through the liquid in the wells on the valve means for opening the latter and providing a flow of liquid downwardly out of the wells through the plurality of tubular means to a plurality of locations toward which the plurality of tubular means are respectively directed.

BRIEF DESCRIPTION OF DRAWINGS

The invention is illustrated by way of example in the accompanying drawings which form part of this application and in which:

FIG. 1 is a partly broken away perspective illustration of one possible device according to the invention;

FIG. 3 is a fragmentary longitudinal sectional elevation of the structure of FIGS. 1 and 2, taken along line 3—3 of FIG. 2 in the direction of the arrows, and also illustrating the structure at a scale which is enlarged as compared to FIG. 1.

DESCRIPTION OF A PREFERRED EMBODIMENT

Figure 2:
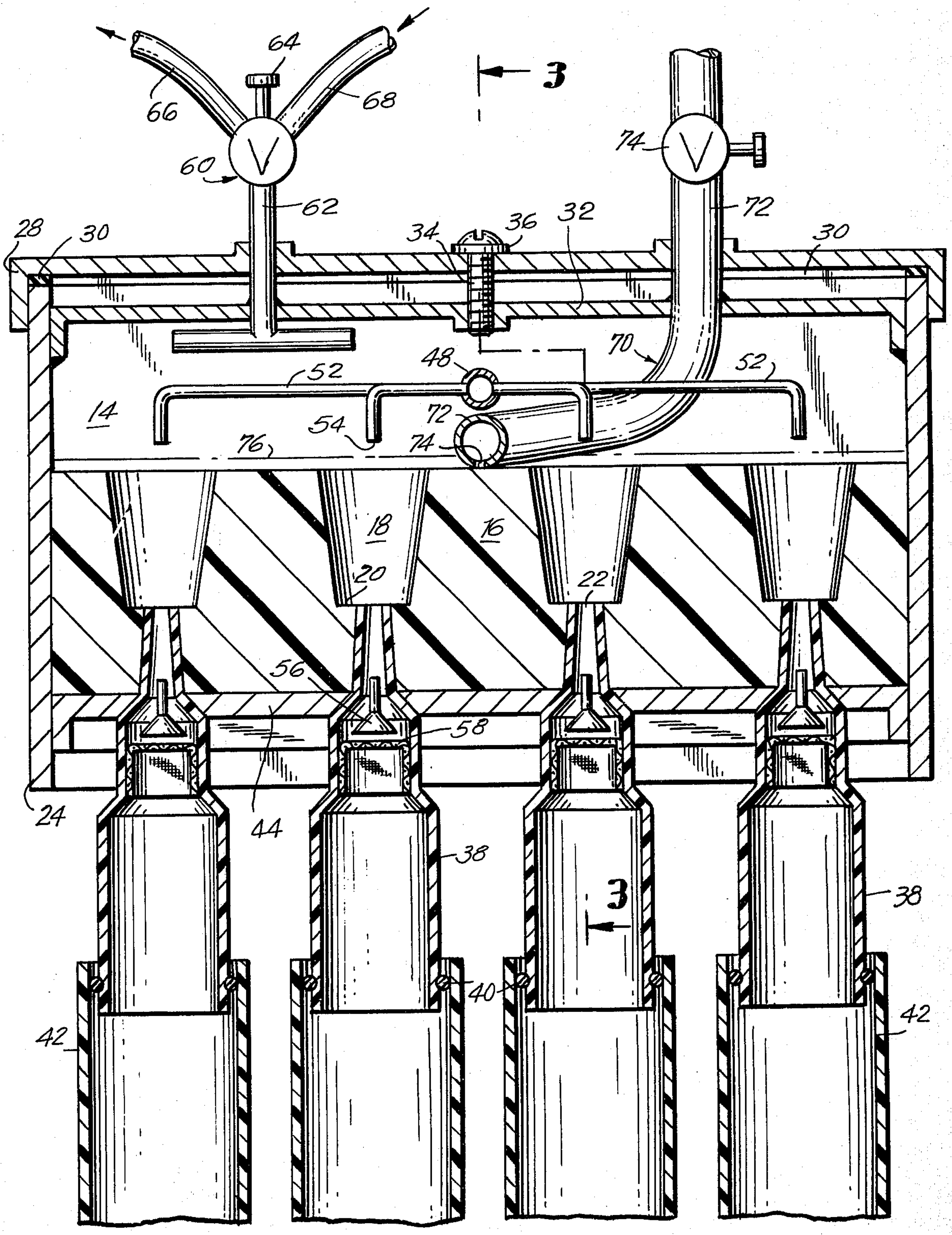
FIG. 2 is a transverse section of the structure of FIG. 1 taken along line 2—2 of FIG. 1 in the direction of the arrows and showing the structure at a scale which is enlarged as compared to FIG. 1.

Referring now to the drawings, there is shown in FIG. 1 a device 10 according to the present invention. This device 10 includes an enclosure means 12 which has an interior airtight space 14. Beneath the space 14 the enclosure means 12 has a bottom wall 16 formed with a plurality of wells 18 all of which communicate with the interior space 14. The several wells 18 are all of the same volume, and in fact they are all of the same configuration, tapering in a downward direction, as is apparent from FIGS. 2 and 3. As is apparent particularly from FIG. 1, the device 10 has a relatively large number of wells 18. In a device which has been constructed according to the invention there are, in fact, forty-four such wells 18. Moreover, as is apparent particularly from FIG. 1, the enclosure means 12 is of an elongated substantially rectangular configuration and the several wells 18 are arranged symmetrically along the bottom wall 16. As is indicated in FIG. 1, as well as FIG. 2, the bottom wall 16 has a series of transverse rows of wells 18 arranged longitudinally along the bottom wall 16, with each transverse row having four wells. In the particular example referred to above there are eleven such transverse rows of four wells each, so that in this way the device easily will accommodate 44 such wells 18.

These wells 18 all respectively have lowermost portions 20 situated distant from the interior space 14, and the wells 18 from the top surface of the bottom wall 16 to their lowermost portions 20 are carefully constructed so as to have precisely determined volumes. In one particular example, the volume of each well 18 is 10 cc. At its lowermost portion 20, each well 18 is formed with an opening 22 each extending from each well 18 completely through the bottom wall 16, and, as is clearly shown in FIGS. 2 and 3, these openings 22 taper slightly in an upward direction. In the particular example illustrated the bottom wall 16 takes the form of a relatively thick plastic wall formed with the several wells 18 and openings 22 extending downwardly therefrom, but it is equally possible to use other constructions such as a construction resembling that of a cupcake tin. The solid plastic construction is preferred, however, because it can be manufactured at relatively low cost and is relatively rigid and robust, being subject to bending and vibrations to an extent which is far less than a thin metallic cupcake tin type of structure.

The enclosure means 12 has in addition to the bottom wall 16, an endless sidewall 24 fixed to and extending along the outer periphery of the wall 16 and extending upwardly as well as downwardly from the wall 16. Where the sidewall 24 extends upwardly from the wall 16 it defines therewith the interior space 14 of the enclosure means 12. This interior space 14 is closed off from the outer atmosphere by a top cover 26. The top cover 26 has along its periphery a downwardly extending flange 28 slidably engaging the exterior surface of the endless sidewall 24, along the entire length of the latter, and between the top edge of the wall 24 and the inside, downwardly directed surface of the cover 26 there is an endless sealing ring 30, so that by way of this construction it is possible to tightly close off the interior space 14 from the outer atmosphere.

In order to be able to releasably fix the top cover 26 in the position illustrated in the drawings, the opposed longitudinally-extending portions of the sidewall 24 are rigidly fixed with a transverse bridge member 32, which may, for example, be welded at its opposed ends to the opposed longitudinal portions of the sidewall 24, as shown most clearly in FIG. 2. This bridge member 32 is formed with a central threaded aperture receiving a fastening screw 34 which extends through a central opening of the top cover 26 in the manner illustrated most clearly in FIGS. 2 and 3. Of course, between the head of the screw 34 and the top surface of the top cover 26 there is a suitable washer 36 which maintains the fluid-tightness of the interior space 14 at the place where the fastening screw 34 extends through the opening of the cover 26.

The several upwardly tapering openings 22 in the bottom wall 16, at the lowermost ends 20 of the wells 18, respectively, are adapted respectively to receive the correspondingly tapered upper end regions of a plurality of tubular liquid-transmitting means 38. The several tubular liquid-transmitting means 38 respectively have opposed open upper and lower ends and because the taper of the upper end regions of the plurality of tubular means 38 matches the taper of the openings 22, these upper end regions of the plurality of tubular means 38 are readily received in the openings 22, in the manner illustrated in FIGS. 2 and 3, so that the interiors of the several tubular means 38 are capable of communicating through the openings 22 with the wells 18 and of course through the latter with the interior space 14. The several tubular means 38 may be made of any suitable plastic, for example, and they pass at their lower ends through O-rings 40 which are situated in the upper interior regions of a plurality of columns 42. These columns 42 are the locations to which the liquid is directed by the plurality of tubular means 38. Columns 42 may, for example, be adsorption columns containing, for example, a material such as plantain, so that when the liquid delivered by the plurality of tubular means 38 is an eluting solution, components of the latter are adsorbed while the solution passes downwardly through the columns 42. It is emphasized, however, that the columns 42 have nothing to do with the present invention and represent only one possible example of the type of locations to which liquid can be delivered by the several tubular means 38. The several columns 42 are carried by any suitable carrier structure and are arranged in a group matching the arrangement of the wells 18. Such a group of columns can be transported in any suitable way to and from the structure of the invention, so that after delivering precisely determined amounts of liquid to one group of columns 42, the apparatus can then be used for delivering the same equal amounts of liquid simultaneously to the next group of columns 42. Each group of columns 42 is brought to the apparatus of the invention with the plurality of tubular means 38 extending upwardly from the several columns 42, and in order to determine precisely the positions of the several columns 38 so that their upper ends will be accurately received in the openings 22, the upper end regions of the columns 38 pass through openings of a plate 44. Thus, the plate 44 will assure that the upwardly tapered upper end regions of the columns 38 will project upwardly beyond the plate 44 in an arrangement matching the arrangement of the several openings 22. When the several columns 42 with the plurality of tubular means 38 extending upwardly therefrom are positioned beneath the wall 16, the latter together with the remainder of the enclosure means 12 is lowered in any suitable way to assume the position shown in the drawings where the plate 44 is received in the space defined between the bottom wall 16 and the portion of the endless sidewall 24 which extends downwardly beyond the wall 16, the inside surface of the sidewall 24 matching the outer peripheral surface of the plate 44 so that the structure will accurately assume the position indicated in the drawings. It is emphasized, however, that the above arrangement is only given by way of illustration. It is perfectly possible to reverse this arrangement and instead to arrange groups of forty-four columns each in a row along a suitable horizontal surface with each of these groups having a plurality of tubular means 38 extending upwardly therefrom, and in this case it is possible to transport the enclosure means 12 from one group to the next after the liquid has been delivered to the columns of the several groups through the several tubular means 38 respectively connected with the columns of each group, in a manner referred to below.

A liquid-supply means 46 communicates fluid-tightly with the interior space 14 of the enclosure means 12 for delivering to this interior space liquid which is to be received in the several wells 18. The liquid supply means 46 includes an elongated central header 48 which extends longitudinally along the interior of the enclosure means 12 at an elevation higher than and parallel to the bottom wall 16, this header 48 being situated precisely midway between the opposed longitudinal portions of the sidewall 24. The header 48 extends fluid-tightly through one of the end walls of the enclosure means, and beyond the enclosure means the header 48 is connected with a valve means 50 which is manipulated in order to close and open the header 48. Beyond the valve means 50 the header 48 communicates with a suitable tank, bucket, or the like, in which is situated the liquid which is to be delivered to the several wells 18.

The liquid-supply means 46 has a plurality of outlets which are respectively aligned with the wells 18 so as to deliver liquid respectively to the several wells 18. For this purpose the liquid-supply means 46 includes a plurality of transversely extending tubular branches 52 all of which communicate with the interior of the header 48. The shorter branches 52 respectively have their downwardly directed outlets 54 aligned with the inner longitudinally extending rows of wells 18, while the longer branches 52 have their downwardly directed outlets 54 respectively aligned with the outer rows of wells 18. Several arrangements of this type are possible. For example where the wells are arranged in straight transverse rows of four each, the longer branches 52 may be inclined forwardly or rearwardly in order to situate their outlets in alignment with the outer wells 18, while the shorter branches 52 can extend perpendicularly with respect to the header 48. However it is also possible to situate the wells of one longitudinal row so that they are offset with respect to the wells of an adjoining longitudinal row, in which case the branches 52 can all extend perpendicularly with respect to the header 48. Of course in this case the several columns 42 and tubular means 38 would have to be correspondingly arranged. It is also possible, however, to provide flexible branches 52 in the form of flexible tubes which have their lower outlets situated directly in the wells 18, supported therein by suitable plastic spider units, for example, so that in this way also it is possible to deliver liquid reliably from the header 48 into the several wells 18.

The several tubular liquid-transmitting means 38 respectively accommodate in their interiors a plurality of valve means 56 which taper upwardly in the same way as the upwardly tapered portions of the several tubular means 38, as is apparent from FIGS. 2 and 3. These valves 56 have upwardly extending stems received in the upper narrow portions of the several tubular means 38 so that the latter guide the valves 56 only for substantially up and down movement. In order to retain the valves 56 in the tubular means 38, the latter have in their interiors a plurality of apertured retaining means 58 in the form of cup-shaped screens, as illustrated in FIGS. 2 and 3. Thus, these screens prevent the valves 56 from falling to an elevation where they will no longer be properly guided for up and down movement by the tubular means 38. When the valves 56 are in their lower open positions they rest on the top surfaces of the retaining screens 58 without preventing liquid from flowing freely through the screens 58 and on through the several tubular means 38 into the columns 42. The several valves 56 are relatively light, so that when less than atmospheric pressure prevails in the interior space 14 of the enclosure means 12, these valves 56 are automatically sucked upwardly to the positions closing the several tubular means 38 at their portions which are situated in communication with the openings 22 at the lowermost ends 20 of the wells 18. However, when a greater than atmospheric pressure prevails in the space 14, these valves 56 will automatically move downwardly to their open positions, so that liquid in the wells 18 can now freely flow downwardly through the tubular means 38 into the several columns 42.

A pressure-control means 60 is provided for controlling the pressure in the interior space 14 of the enclosure means 12. This pressure-control means 60 is in the form of a two-way valve communicating with a downwardly extending tube 62 of inverted T-shaped configuration, as shown most clearly in FIG. 2. The vertical leg of the tube 62 communicates directly with the valve 60 while a lower horizontal leg thereof is completely open and communicates freely with the interior space 14 as well as with the interior of the vertical leg of the T-tube 62. The valve 60 can be manually controlled by way of a valve-operating member 64 of well known construction. Through the member 64 it is possible for the valve 60 to place the T-tube 62 in communication with a pipe 66 leading to any suitable source of suction such as a vacuum pump, so that in this position of the pressure-control means 60, the space 14 will be evacuated. However it is also possible to manipulate the member 64 so as to place the pressure-control means 60 in a position where the T-tube 62 communicates with a second pipe 68 communicating with a tank of air at greater than atmospheric pressure, so that now the interior space 14 will have a pressure greater than atmospheric pressure. It will be noted that the vertical leg of the T-tube 62 extends not only fluid-tightly through the top cover 26 but also through a suitable opening in the bridge element 32, so that the rigid mounting of the T-tube 62 is assured. The T-tube 62 can be rigidly fixed with the bridge 32, as by being welded thereto, and whenever it is desired to remove the top cover 26, the valve 60 can be disconnected from the upper end of the tube 62, so that upon unscrewing the fastening screw 34 the cover 26 can be slipped upwardly beyond the vertical leg of the T-tube 62.

It is, of course, possible to make the top cover 26 and/or sidewall 24 of a transparent sheet material so that the precise filling of the several wells 18 can be determined visually by the operator, but instead of such an arrangement, which is not very reliable, it is preferred according to a further feature of the invention to provide an arrangement according to which liquid is supplied by the liquid-supply means 46 to such an extent that the liquid level is slightly higher than the top surface of the bottom wall 16 of the enclosure means 12, and then by way of a liquid-removing means 70, described below, the excess liquid extending to an elevation higher than the top surface of the bottom wall 16 is removed, so that in this way it is possible very precisely to fill the wells 18 just up to the level of the top surface of the bottom wall 16. The liquid-removing means 70 includes an elongated tube 72 which rests directly on the top surface of the bottom wall 16, extending longitudinally and centrally along the interior space 14, as illustrated. This tube 70 is formed with a row of openings 74 which are situated at the top surface of the bottom wall 16. The tube 72 has a closed end adjacent the left end wall portion of the sidewalls 24, as viewed in FIG. 3. From the opposed end portion of the sidewall 24 of the tube 72 extends back to the bridge 32, as shown in dotted lines in FIG. 1, and from beneath the bridge the tube 72 extends upwardly through the bridge and fluid-tightly through the top cover 26. Upwardly beyond the top cover 26 the tube 72 is connected with a valve means 74 which may be opened and closed, and beyond the valve means 74 the tube 72 communicates with a suitable source of suction which may be the same source of suction with which the tube 66 communicates. Of course in this case also the tube 72 may be rigidly fixed with the bridge 32 so as to be maintained properly positioned in the enclosure means 12, and the valve 74 can be removed from the tube 72 when it is desired to remove the cover 26 in the manner described above in connection with the T-tube 62.

The above-described structure operates as follows:

Assuming that the several wells 18 are empty and that the structure of the invention has been placed in the condition illustrated in the drawings and described above, the operator will place the pressure-control means 60 in the position where the suction tube 66 communicates with the T-tube 62 so that the pressure in the interior space 14 is less than atmospheric pressure and the several valves 56 are automatically sucked into their closed positions. The operator will then open the valve 50 so that through the header 48 liquid will be sucked into the enclosure means 12 from a suitable source of liquid which communicates through the valve 50 with the header 48. The extent of delivery of liquid in this way to the interior space 14 and the several wells 18 from the outlets 54 need not be precisely determined. It is only required that the liquid be delivered to an extent sufficient to have a level above the top surface of the bottom wall 16, such as the level 76 indicated in FIG. 2. Since the elevation 76 of the surface of the liquid need not be precisely determined, assuring that the wells 18 have been more than filled can be brought about very simply by maintaining the valve 50 open for a suitable length of time, or part of the cover 27 may be made transparent so that the operator can visually see that the liquid level is higher than the top surface of the bottom wall 16. This can also be done by way of a transparent portion of sidewall 24. Thus, once the liquid has been filled to an elevation higher than the top surface of the bottom wall 16, the operator closes the valve 50 and opens the valve 74 so that excess liquid extending higher than the top surface of the bottom wall 16 is removed by way of the liquid-removing means 70. Thus, upon opening of the valve 74, the suction in the interior of the tube 72 will suck excess liquid through the opening 74 away from the top surface of the bottom wall 16, and as soon as liquid no longer flows out through the tube 72, it is known that the several wells 18 are precisely filled. The determination of the removal of liquid from the elevation higher than the top surface of the bottom wall 16 can also be determined by a transparent portion of the sidewall 24, or a part of the tube 72 may be transparent so that the operator can see that liquid no longer flows out through the tube 72. Once this latter stage of the operation has been reached, the operator will close the valve 74 and change the position of the valve 60 so that the T-tube 62 is now placed through the pipe 68 in communication with a source of air under pressure, for example. In this way the pressure in the space 14 is increased from below atmospheric pressure to above atmospheric pressure, and the result is that this air at greater than atmospheric pressure pushes the liquid in the wells 18 downwardly out of the wells and through the bottom openings 22, automatically opening the valves 56, and thus bringing about by way of the tubular means 38 a transmittal of the liquid from the several wells 18 respectively to the columns 42.

The entire operation set forth above goes forward very rapidly, requiring less than one minute. As soon as the precisely determined amounts of liquid have been delivered into the several columns 52, the enclosure means 12 is raised away from the several tubular means 38 and the next group of tubular means 38 with columns 42 extending downwardly therefrom is moved into position beneath the enclosure means 12 whereupon the latter is lowered and the above operations are repeated.

Of course, it is possible to add various devices to the structure described above so as to render the operations substantially entirely automatic. The above manual operation has been described and structure to be manually operated has been illustrated for the sake of simplicity in the disclosure of the invention. Thus, the several valves 50, 60, and 74 can be solenoid valves which can be electrically operated, and a mechanical device can be connected with the enclosure means 12 for raising and lowering the same. Such solenoid valves can be automatically operated through a suitable timing circuit in such a way that first the valves 60 places the space 14 in communication with the source of suction through the pipe 66, whereupon the valve 50 is automatically opened and maintained open only for a length of time sufficient to enable the liquid to more than fill the wells 18, whereupon the circuit will automatically close the valve 50 and open the valve 74, so that the excess will be automatically removed as set forth above. This valve 74 can then also be automatically maintained open only for a predetermined time which is sufficient to remove the excess liquid, whereupon the valve 74 will be automatically closed and the valve 60 will be placed in the position according to which the T-tube 62 will communicate with the pipe 68 so that the pressure in the space 14 will be increased, and then after a suitable length of time the valve 60 is returned to an intermediate neutral position placing the interior space 14 in communication with the outer atmosphere, whereupon the mechanical device raises the enclosure means 12, the group of columns 42 with the tubular means 38 are transported away from beneath the enclosure means 12, the next group is brought into position, the enclosure means 12 is lowered, and the valve 60 is again placed automatically in the position where the space 14 is evacuated, and the above operations are automatically repeated.

Thus, through the simple, inexpensive structure of the invention it is possible very reliably to deliver simultaneously to a plurality of locations amounts of liquid which not only are precisely determined but which are precisely equal to each other.

What is claimed is:

1. In a device for delivering equal amounts of liquid simultaneously to a plurality of locations, enclosure means having an interior airtight space, said enclosure means having beneath said interior space thereof a bottom wall formed with a plurality of wells all communicating with said space and all adapted to be situated at the same elevation during use of the device, said wells all having equal volumes, respectively, and all having lowermost portions most distant from said space and respectively formed with openings, a plurality of tubular liquid-transmitting means situated at the exterior of said enclosure means and all connected with said bottom wall of said enclosure means and all respectively communicating with said wells through said openings at said lowermost portions thereof, a plurality of valve means respectively situated in said plurality of tubular means for responding automatically to less than atmospheric pressure in said interior space of said enclosure means for assuming closed positions respectively closing said tubular means while responding to greater than atmospheric pressure for automatically assuming open positions opening said plurality of tubular means, respectively, liquid-supply means connected with said enclosure means and extending fluid-tightly into the interior space thereof for supplying liquid to said interior space in response to the presence of less than atmospheric pressure in said interior space of said enclosure means, said liquid-supply means having a plurality of outlets respectively situated in alignment with said wells for delivering liquid thereto when said space in the interior of said enclosure means is at less than atmospheric pressure, and pressure-control means connected with said enclosure means and communicating with said interior space thereof for controlling the pressure therein, said pressure-control means providing first less than atmospheric pressure in said space for acting through said liquid-supply means to fill said wells with liquid while simultaneously placing said plurality of valve means in their closed positions, and said pressure-control means then providing greater than atmospheric pressure in said interior space of said enclosure means for acting through the liquid in said wells on said valve means for opening the latter and providing a flow of liquid downwardly out of said wells through said plurality of tubular means to a plurality of locations toward which said plurality of tubular means are respectively directed.

2. The combination of claim 1 and wherein said liquid-supply means includes an elongated header extending along the interior of said enclosure means at an elevation higher than said bottom wall thereof, and a plurality of tubular branches extending from and communicating with said header and respectively terminating in said outlets which are respectively aligned with said wells.

3. The combination of claim 2 and wherein said wells, header and tubular branches are symmetrically arranged within said enclosure means.

4. The combination of claim 1 and wherein said enclosure means includes an endless side wall fixed to and extending upwardly from said bottom wall and surrounding said interior space situated in said enclosure means over said bottom wall thereof, and said enclosure means further including a top cover fluid-tightly engaging said side wall and closing off said interior space from the outer atmosphere.

5. The combination of claim 1 and wherein said pressure-control means includes a valve means connected with said enclosure means and communicating with the interior thereof, the latter valve means having one position for placing the interior space of said enclosure means in communication with a source of suction, to create less than atmospheric pressure in said space, and the latter valve means having another position for placing the interior space of said enclosure means in communication with a source of pressure, for creating in said interior space of said enclosure means a pressure greater than atmospheric pressure.

6. The combination of claim 2 and wherein said header extends to the exterior of said enclosure means and carries at the exterior of said enclosure means a valve means for closing said header after liquid has been delivered to said wells while less than atmospheric pressure prevails in said interior space of said enclosure means.

7. The combination of claim 1 and wherein said plurality of valve means in said plurality of tubular means respectively include tapered valve members which taper in an upward direction, said plurality of tubular means having upwardly tapering tubular portions extending to said openings at said lowermost portions of said wells and receiving part of said valve members, the latter moving upwardly into said tapered portions of said tubular means in response to less than atmospheric pressure in said interior space of said enclosure means for automatically closing said plurality of tubular means.

8. The combination of claim 7 and wherein said plurality of tubular means carry in their interiors a plurality of apertured retaining members which retain said valve members in said plurality of tubular means while permitting liquid to flow freely through said apertured retaining members.

9. The combination of claim 8 and wherein said apertured retaining members are in the form of screens.

10. The combination of claim 1 and wherein said liquid-supply means responds to less than atmospheric pressure in said interior space of said enclosure means for delivering to said enclosure means sufficient liquid not only to fill said wells but also to cover said bottom wall and extend above said wells, and liquid-removing means carried by said enclosure means and communicating with the interior space thereof for removing from said interior space liquid down to the level of an upper surface of said bottom wall for maintaining said wells precisely filled with liquid extending only to the level of the upper surface of said bottom wall, for delivering precisely determined amounts of liquid respectively to said locations through said plurality of tubular means.

11. The combination of claim 10 and wherein said liquid-removing means includes an elongated tube extending along said upper surface of said bottom wall and formed with openings situated at said upper surface of said bottom wall, and a valve means communicating with the latter tube for placing the latter in connection with a source of suction by means of which excess liquid extending above the level of the upper surface of said bottom wall is withdrawn from the interior of said enclosure means.

* * * * *